United States Patent [19]

Darden

[11] Patent Number: 4,587,028

[45] Date of Patent: May 6, 1986

[54] NON-SILICATE ANTIFREEZE FORMULATIONS

[75] Inventor: Jerome W. Darden, Austin, Tex.

[73] Assignee: Texaco Inc., White Plains, N.Y.

[21] Appl. No.: 660,623

[22] Filed: Oct. 15, 1984

[51] Int. Cl.$^4$ ............................................. C09K 5/00
[52] U.S. Cl. ...................................... 252/76; 252/74; 252/75; 252/79
[58] Field of Search ....................... 252/74, 75, 76, 79

[56] References Cited

U.S. PATENT DOCUMENTS

| | | | |
|---|---|---|---|
| 4,242,214 | 12/1980 | Lambert, Jr. | 252/75 |
| 4,338,209 | 7/1982 | Manabe et al. | 252/75 |
| 4,382,008 | 5/1983 | Boreland et al. | 252/75 |

*Primary Examiner*—Paul Lieberman
*Assistant Examiner*—Robert A. Wax
*Attorney, Agent, or Firm*—Jack H. Park; Kenneth R. Priem; Richard A. Morgan

[57] ABSTRACT

Non-silicate, non-gelling corrosion inhibited antifreeze compositions containing a water-soluble liquid alcohol freezing point depressant and an inhibitor combination comprising an alkali metal salt of benzoic acid, an alkali metal salt of a dicarboxylic acid and an alkali metal nitrate are described. These formulations work just as well or better than silicate-based formulations in all regards and have the advantage of not having to contain expensive organo silane gellation inhibitors as do silicate-containing antifreezes. The dicarboxylic acid used preferably has eight to twelve carbon atoms.

9 Claims, No Drawings

NON-SILICATE ANTIFREEZE FORMULATIONS

BACKGROUND OF THE INVENTION

1. Field of the Invention

The invention pertains to a corrosion inhibitor combination for cooling systems containing antifreeze with solutions based on water-soluble alcohols, and more particularly relates to such combinations containing no silicates.

2. Other Combinations in the Field

A number of other corrosion inhibitor combinations have been devised to prevent corrosion in automotive cooling systems containing antifreeze solutions based on water-soluble alcohols. For example, U.S. Pat. No. 4,242,214 to Lambert describes a combination which includes sodium tetraborate, sodium benzoate, sodium metaborate, sodium metasilicate and tolyltriazole or benzotriazole.

British Military Specification TS 10177 (March, 1978) calls for the use of 4.0 to 4.5 wt. % disodium sebacate and 0.25 to 0.30 wt. % benzotriazole as an effective corrosion inhibitor package for an antifreeze formulation. See also British Pat. No. 1,004,259 to Aiken, et al. which teaches a corrosion inhibitor composition having a mixture of benzotriazole and/or methylbenzotriazole and an alkali metal, ammonium, amine or alkanolamine salt of a saturated dicarboxylic acid having from six to thirty carbon atoms per molecule.

U.S. Patent 4,382,008 to Boreland, et al. relates to an antifreeze corrosion inhibitor composed of a triazole, an alkali metal borate, an alkali metal benzoate or homologue thereof, an alkali metal silicate and an alkali metal salt of a dibasic organic acid having 7 to 13 carbon atoms. French Certificate of Utility No. 2,489,355 to Perrot teaches sodium sebacate as a corrosion inhibitor for glycol antifreezes based on monoethylene or monopropylene glycol optionally in conjunction with other additives, especially sodium metasilicate, $K_2HPO_4$, tolutriazole or 1,2,3-benzotriazole.

A metal corrosion inhibitor having (1) a compound selected from the group of benzoic acid, sodium benzoate and potassium benzoate, (2) a compound selected from the group of nitrous acid, sodium nitrite and potassium nitrite, (3) a compound selected from the group of phosphoric acid, sodium dihydrogenphosphate, disodium hydrogenphosphate, trisodium phosphate, potassium dihydrogenphosphate, dipotassium hydrogenphosphate and tripotassium phosphate, and (4) a compound from the group of mercaptobenzothiazole, its salts, benzotriazole and tolyltriazole is revealed in U.S. Pat. No. 4,338,209 to Manabe, et al. Further, U.S. Pat. No. 4,455,248 to Wood discloses a single-phase glycol-based antifreeze composition having multi-metal corrosion protection which contains certain silicate, phosphate, borate, nitrate, azole and alkali compounds in specified proportions.

Silicates are excellent corrosion inhibitors, especially for aluminum components, but they suffer from two major disadvantages. First, they have a tendency to form an insoluble gel during storage. Expensive organosilanes must then be used to prevent gel formation in the antifreeze. Second, silicates have a tendency to become depleted from the solution over the life of the antifreeze. This depletion results in a reduction in the corrosion protection provided by the antifreeze.

Thus, it is an object of this invention to provide an antifreeze formulation which gives corrosion protection results as good as those obtained with silicate-based corrosion inhibition systems, but without the silicates.

SUMMARY OF THE INVENTION

The invention concerns a non-silicate, non-gelling corrosion inhibited antifreeze composition having a water-soluble liquid alcohol freezing point depressant and an inhibitor combination of an alkali metal salt of benzoic acid, an alkali metal salt of a dicarboxylic acid and an alkali metal nitrate, in the absence of silicates.

DETAILED BRIEF DESCRIPTIONS OF THE PREFERRED EMBODIMENTS

The compositions of this invention in one embodiment consist of ethylene glycol, water, alkali metal salts of benzoic acid, alkali metal salts of nitrates and optionally alkali metal nitrites and aromatic azoles such as tolyltriazole or benzotriazole. The pH range of these compositions is preferably about 7 to 11.

Since the formulations described herein contain no silicates, problems associated with the use of silicates noted above are avoided. Surprisingly, the new compositions provide protection for aluminum parts comparable to that provided by silicates. They also do not suffer gellation problems.

The freezing point depressants of the present invention include any of the water-soluble liquid alcohols such as monohydroxy lower alkyl alcohols and the liquid polyhydroxy alcohols such as the alkylene and dialkylene glycols. Specific examples of the alcohol contemplated herein are methanol, ethanol, propanol, isopropanol, butanol, ethylene glycol, diethylene glycol, propylene glycol, butylene glycol and mixtures thereof. A preferred glycol is ethylene glycol, which as sold commercially often contains a small amount, up to 10% by weight, of diethylene glycol. The term ethylene glycol as used herein is intended to include either the pure or commercial compound. This is also true of the other freezing point depressant alcohols contemplated herein.

The antifreeze composition should contain at least one alkali metal salt of benzoic acid, also known as an alkali metal benzoate. The proportion is preferably 2 to 5 wt. % based on the freezing point depressant, calculated as benzoic acid. The most preferred range is 2.5–4.0 wt. % calculated as benzoic acid. Examples of the benzoate that can be employed in the present invention include sodium benzoate and potassium benzoate. Benzoic acid and benzoates may be employed singly or in admixture thereof. Toluates are suitable homologues of the benzoates.

The composition should also contain an alkali metal salt of a dicarboxylic acid. Preferably, the proportions of the dicarboxylic acid salts are from about 0.5 to 1.5 wt. % based on the freezing point depressant proportion. The most preferred range is 0.6 to 1.2 wt. %. It is further preferred that the dicarboxylic (or dibasic) acid have from 8 to 12 carbon atoms, inclusive. Thus, the preferred acids would be suberic, azelaic, sebacic, undecanedioic and dodecanedioic, although dibasic acids outside this range may be employed. The preferred alkali metals for these salts are sodium and potassium, with sodium being particularly preferred. The particularly preferred dicarboxylic acid is sebacic acid and thus the most preferred salt is sodium sebacate. It is anticipated that amine salts, ammonium salts or alkanolamine salts of these dibasic acids might prove effective, but they are much less preferred due to the possible formation of undesirable nitrosamines.

The third necessary component in this corrosion inhibitor package is at least one alkali metal nitrate. Proportions of the alkali metal nitrate are minor, preferably on the order of 0.1 to 0.5 wt. % based on the freezing point depressant proportion. The nitrate is preferably sodium nitrate or potassium nitrate, with sodium nitrate being especially preferred.

Other compounds may be optionally included in this corrosion inhibitor formulation, such as alkali metal hydroxides, alkali metal nitrites and aromatic azoles, such as tolyltriazole or benzotriazole. The functions and common proportions of these additives are well known in the art.

When the antifreeze composition of my invention is to be utilized in a heat exchange or automotive cooling system, it may be combined with water in any proportion. The antifreeze compositions of my invention may contain other conventional additives such as dyes, antifoam agents, etc. For example, suitable antifoam agents include silicone emulsions and polyglycols. Especially efficient polyglycol antifoam agents are block copolymers prepared by adding ethylene oxide to polypropylene glycol. Of course, silicates of any form are not contemplated as part of the formulation of my invention.

The following examples will further illustrate the invention, but are not meant to limit its spirit or scope.

EXAMPLE 1

The following formulation was prepared:

|  | wt. % |
|---|---|
| Ethylene glycol | 92.9 |
| NaOH, 50% | 0.8 |
| Sebacic acid | 1.0 |
| Sodium benzoate | 3.0 |
| $NaNO_2$ | 0.5 |
| $NaNO_3$ | 0.2 |
| Tolyltriazole | 0.2 |
| $H_2O$ | 1.4 |

A portion of this formulation was diluted to 25% with chloride ion-containing water, then tested in the ASTM D-4340 Aluminum Hot Surface Test. This test gives an indication of the ability of the antifreeze to prevent corrosion of aluminum heat rejecting surfaces. The test is run at high temperatures under pressure; thus, it is a severe test. Results of this test are given below.

| ASTM D-4340 Aluminum Hot Surface Test | |
|---|---|
|  | wt. loss, mg/cm$^2$/week |
| Example 1 formulation | 0.25 |
| ASTM Specification max | 1.0 |

Silicate-containing antifreeze formulations typically give weight losses of 0.1-0.5 mg/cm$^2$/week in this test. The composition of this invention provides the same protection to aluminum heat rejecting surfaces as do silicate-containing formulations.

EXAMPLE 2

The formulation prepared in Example 1 was tested in the Ford Electrochemical Pitting Potential Test. This test gives an indication of the amount of protection against aluminum pitting corrosion provided by an antifreeze. Results of this test are given below.

| Ford Electrochemical Pitting Test | |
|---|---|
|  | Ep. mV vs. SCE |
| Example 1 formulation | −160 |
| Ford specification | less negative than −400 |

EXAMPLE 3

The antifreeze composition prepared in Example 1 was tested in the Texaco Modified ASTM D-1384 Glassware Corrosion Test. The antifreeze is tested at a concentration of 25% in ASTM corrosive water instead of the 33-1/3% called for by ASTM; thus, the modified test is more severe. Results are given below.

| ASTM D-1384 Texaco Modified Glassware Test | | | | | | |
|---|---|---|---|---|---|---|
|  | | wt. loss mg/coupon | | | | |
|  | Cu | 70/30 Solder | Brass | Steel | Fe | Al |
| Example 1 formulation | 3 | 4 | 4 | 1 | −3 gain | −3 gain |
| Texaco Spec., max. | 10 | 30 | 10 | 10 | 10 | 30 |

These results are comparable to or better than results obtained in this test using commercially available silicate-containing antifreeze.

EXAMPLE 4

Both disodium sebacate and sodium benzoate are needed in the formulations of this invention to provide adequate corrosion protection for aluminum and other metals commonly found in automobile cooling systems. The following results were given by a formulation similar to that in Example 1, but with no sebacic acid.

| Texaco Modified ASTM D-1384 Glassware Test | | | | | | |
|---|---|---|---|---|---|---|
|  | | wt. loss, mg/coupon | | | | |
|  | Cu | 70/30 Solder | Brass | Steel | Fe | Al |
| Example 4 formulation | 10 | 4 | 5 | 3 | 21 | 12 |
| Texaco spec., max. | 10 | 30 | 10 | 10 | 10 | 30 |

The omission of sebacic acid results in an antifreeze which gives little protection for cast iron and less than adequate protection for aluminum and copper.

EXAMPLE 5

Comparative Formulation

A silicate based antifreeze containing 0.3 wt. % $Na_2SiO_3 \cdot 5H_2O$, $H_3PO_4$, NaOH, $NaNO_3$ and tolyltriazole was tested in various corrosion tests. Results are given below.

|  | wt. loss, mg/coupon | | | | | |
|---|---|---|---|---|---|---|
|  | Cu | Solder | Brass | Steel | Fe | Al |
| Texaco Modified ASTM D-1384 Glassware Test | 4 | 0 | 5 | 1 | 4 | 1 |
|  | wt. loss, mg/cm$^2$/week | | | | | |
| ASTM D-4340 Aluminum Hot Surface Test | 0.2 | | | | | |

-continued

| | Ep., mV vs. SCE |
|---|---|
| Ford Electrochemical Pitting Test | −170 |

EXAMPLE 6

Stability Test

The silicate based formulation of Example 5 was placed in a storage stability test. This test consists of placing 100g of the antifreeze or coolant formulations in an oven at 65° C. and noting the time needed for gel to form. One day's storage at 65° C. is approximately equal to storage for one month at room temperature. Thus, the storage stability test gives a measure of the shelf life of the antifreeze or coolant. This silicate based formulation gels after only four days at 65° C., equivalent to a shelf life of four months. This is not satisfactory, since many antifreeze formulations are stored for more than 24 months. The shelf life of such silicate based antifreeze formulations can be extended; however, this requires the use of expensive organosilanes.

EXAMPLE 7

The formulation of this invention prepared in Example 1 was placed in the storage stability test. This sample showed no signs of flocculant or gel formation after 44 days, equivalent to a shelf life of over 44 months. Since the formulations of this invention contain no silicate, there is no danger of gel formation during storage. A comparison of corrosion test data from the formulations of this invention with the data of the Example 5 formulation shows that the formulations of this invention provide the same excellent corrosion protection without the use of silicates.

EXAMPLE 8

Silicate Based Formulation

A silicate based antifreeze of the following composition was prepared.

| | Weight Percent |
|---|---|
| Ethylene glycol | 95.7 |
| Na benzoate | 3.0 |
| NaNO$_2$ | 0.3 |
| Na$_2$SiO$_3$.5H$_2$O | 0.2 |

This composition is similar to the ones claimed in this invention except that it contains silicate. The sample was tested in the ASTM D-4340 Aluminum Hot Surface Test. Results are given below.

| ASTM D-4340 Aluminum Hot Surface Test | |
|---|---|
| | Weight loss, mg/cm$^2$/week |
| Example 8 formulation | 1.45 |
| Example 1 formulation | 0.25 |

This shows that the compositions of this invention are, in fact, superior in their ability to protect aluminum heat rejecting surfaces to similar compositions containing silicate.

EXAMPLE 9

Comparative Example

An antifreeze concentrate, prepared with the following inhibitor content, was tested in the ASTM D-1384 Glassware Test. Note no dicarboxylic acid salt was employed.

| | Weight Percent |
|---|---|
| Ethylene glycol | 94.5 |
| Na benzoate | 5.0 |
| NaNO$_2$ | 0.5 |

This solution was prepared according to British Standard 3151:1959. Results of the test are given below.

| | Weight loss, mg/coupon | | | | | |
|---|---|---|---|---|---|---|
| | Cu | Solder | Brass | Steel | Fe | Al |
| ASTM D-1384 Glassware Test | 7 | −1 | 2 | −1 | −1 | 32 |

This composition, although containing more benzoate, is clearly inferior compared to compositions of this invention in its protection of aluminum.

EXAMPLE 11

Composition of This Invention

An antifreeze concentrate with the following composition was prepared.

| | Weight Percent |
|---|---|
| Ethylene glycol | 92.3 |
| NaOH, 50% | 0.6 |
| Sebacic acid | 0.8 |
| Na benzoate | 4.0 |
| NaNO$_2$ | 0.5 |
| NaNO$_3$ | 0.2 |
| Tolyltriazole | 0.2 |
| H$_2$O | 1.4 |

This antifreeze was tested in the Texaco Modified ASTM D-1384 Glassware Test. Results are given below.

| | Weight loss, mg/coupon | | | | | |
|---|---|---|---|---|---|---|
| | Cu | Solder | Brass | Steel | Fe | Al |
| ASTM Glassware Test | 4 | 2 | 5 | 0 | 0 | 3 |

This antifreeze, like the one of Example 1 of this invention, provides excellent corrosion protection for all metals in this test, including aluminum.

This formulation was also tested in the ASTM D-4340 Aluminum Hot Surface Test. Results are given below.

| ASTM D-4340 Aluminum Hot Surface Test | |
|---|---|
| | Weight loss, mg/cm$^2$/week |
| Example 11 formulation | 0.2 |
| ASTM spec., max. | 1.0 |

It can be seen that the compositions of this invention give excellent protection of aluminum heat rejecting surfaces.

Many modifications may be made in the non-silicate corrosion inhibited antifreeze compositions of this invention without departing from its spirit and scope which are defined only in the appended claims. For example, the nature and proportions of the additives could be modified to give an antifreeze composition with particularly advantageous properties.

I claim:

1. A non-silicate, non-gelling corrosion inhibited antifreeze composition comprising a water-soluble liquid alcohol freezing point depressant comprising ethylene glycol and an inhibitor combination comprising.
    a. about 2 to 5 percent of an alkali metal salt of benzoic acid,
    b. about 0.5 to 1.5 percent of an alkali metal salt of a dicarboxylic acid having eight to twelve carbon atoms, and
    c. about 0.1 to 0.5 percent of an alkali metal nitrate in the absence of silicates.

2. The antifreeze composition of claim 1 in which the alkali metal salt of benzoic acid is sodium benzoate.

3. The antifreeze composition of claim 1 in which the alkali metal salt of dicarboxylic acid is sodium sebacate.

4. The antifreeze composition of claim 1 in which the alkali metal nitrate is sodium nitrate.

5. The antifreeze composition of claim 1 in which at least one additional ingredient is present which is selected from the group consisting of alkali metal hydroxides, alkali metal nitrites and aromatic azoles.

6. A process for inhibiting the corrosion of metals which come in contact with an antifreeze composition, which comprises contacting the surface of the metal to be inhibited against corrosion with the antifreeze composition of claim 1.

7. A non-silicate corrosion inhibited antifreeze composition comprising a water-soluble liquid alcohol freezing point depressant comprising ethylene glycol and an inhibitor combination comprising:
    a. about 2 to 5 percent of sodium benzoate,
    b. about 0.5 to 1.5 percent of sodium sebacate, and
    c. about 0.1 to 0.5 percent of sodium nitrate in the absence of silicates.

8. The antifreeze composition of claim 7 in which at least one additional ingredient is present which is selected from the group consisting of alkali metal hydroxides, alkali metal nitrites and aromatic azoles.

9. A process for inhibiting the corrosion of metals which come in contact with an antifreeze composition, which comprises contacting the surface of the metal to be inhibited against corrosion with the antifreeze composition of claim 7.

* * * * *